US012704669B2

(12) United States Patent
Lee et al.

(10) Patent No.: US 12,704,669 B2
(45) Date of Patent: Aug. 11, 2026

(54) ELECTRONIC DEVICE INCLUDING PLURALITY OF DOTS

(71) Applicant: InnoLux Corporation, Miao-Li County (TW)

(72) Inventors: Wei-Cheng Lee, Miao-Li County (TW); I-An Yao, Miao-Li County (TW); Jiunn-Shyong Lin, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 19/237,823

(22) Filed: Jun. 13, 2025

(65) Prior Publication Data

US 2025/0306262 A1 Oct. 2, 2025

Related U.S. Application Data

(63) Continuation of application No. 18/403,492, filed on Jan. 3, 2024, now Pat. No. 12,379,539.

(30) Foreign Application Priority Data

Jan. 13, 2023 (CN) ......................... 202310041415.2

(51) Int. Cl.
*F21V 8/00* (2006.01)
*G02F 1/1333* (2006.01)
(Continued)

(52) U.S. Cl.
CPC ......... *G02B 6/0043* (2013.01); *G02B 6/0055* (2013.01); *G02F 1/133616* (2021.01);
(Continued)

(58) Field of Classification Search
CPC . G02B 6/0043; G02B 6/0055; G02F 1/13338; G02F 1/133615; G02F 1/133616
See application file for complete search history.

(56) References Cited

U.S. PATENT DOCUMENTS 11,163,102 B2 * 11/2021 Chung ................. G02B 6/0053
2022/0260771 A1 * 8/2022 Liao ..................... G02B 6/0038
2024/0126000 A1 * 4/2024 Tan ...................... G02B 6/0036

* cited by examiner

*Primary Examiner* — Keith G. Delahoussaye

(74) *Attorney, Agent, or Firm* — MUNCY, GEISSLER, OLDS & LOWE, P.C.

(57) ABSTRACT

An electronic device includes a reflective element, a light guide plate and a light source. The light guide plate is arranged on the reflective element, and has a first surface, a second surface and a side surface connected between the first surface and the second surface, wherein the first surface is disposed between the reflective element and the second surface. The light source is adjacent to the side surface of the light guide plate. When light emitted from the light source passes through the light guide plate, a light shape diagram is emitted from the second surface. Wherein, the light shape diagram has an inclination angle and an orientation angle ranging from 0 to 360 degrees. Wherein, in a position far away from the light source is defined as the orientation angle of 90 degrees, and a direction parallel to the normal of the first surface is defined as the inclination angle of 0 degrees, and wherein, when the orientation angle is 90 degrees and the inclination angle is smaller than 40 degrees, a corresponding brightness is greater than 50% of a maximum brightness in the brightness distribution.

7 Claims, 5 Drawing Sheets

(51) Int. Cl.
*G02F 1/1335* (2006.01)
*G02F 1/13357* (2006.01)

(52) U.S. Cl.
CPC ........ *G02B 6/0036* (2013.01); *G02F 1/13338* (2013.01); *G02F 1/133615* (2013.01)

ML1
21
90°
120°
60°
150°
30°
180°
20°
40°
60°
(θ)
CL1
210°
330°
240°
300°
270° (Ψ)
ml1
X
Z
Y
-1400.000000
-1200.000000
-800.000000
-400.000000
-0.000000

ELECTRONIC DEVICE INCLUDING PLURALITY OF DOTS

CROSS-REFERENCE TO RELATED APPLICATIONS

This application claims the benefits of the Chinese Patent Application Serial Number 2023100414152, filed on Jan. 13, 2023, the subject matter of which is incorporated herein by reference. This application is a continuation (CA) of U.S. patent application for "ELECTRONIC DEVICE INCLUDING REFLECTIVE PANEL FOR PROVIDING FIRST MAXIMUM BRIGHTNESS, AND SECOND MAXIMUM BRIGHTNESS", U.S. application Ser. No. 18/403,492 filed Jan. 3, 2024.

BACKGROUND

Field of the Disclosure

The present disclosure relates to an electronic device and, more particularly, to an electronic device with a light guide plate.

Description of Related Art

The reflective display is usually provided with a light guide plate and a side light source, so that users may use the reflective display in a dark room or in a place with weak light. However, the existing reflective display may produce serious white fog phenomenon, or reduce the definition of the display frame, so that the quality of the display frame may be affected.

Therefore, it is desired to provide an improved electronic device to mitigate and/or obviate the aforementioned problems.

SUMMARY

The present disclosure provides an electronic device, which includes: a reflective panel; a light guide plate arranged on the reflective panel, and provided with a first surface, a second surface and a side surface connected between the first surface and the second surface, wherein the first surface is adjacent to the reflective panel; and a light source adjacent to the side surface of the light guide plate, wherein, when light emitted from the light source passes through the light guide plate, a first light shape diagram is obtained by performing measurement on the first surface, a second light shape diagram is obtained by performing measurement on the second surface, the first light shape diagram has a first maximum brightness, the second light shape diagram has a second maximum brightness, and the first maximum brightness is greater than the second maximum brightness.

The present disclosure further provides an electronic device, which includes: a reflective panel; a light guide plate arranged on the reflective panel, and provided with a first surface, a second surface and a side surface connected between the first surface and the second surface, wherein the first surface is adjacent to the reflective panel; and a light source adjacent to the side surface of the light guide plate, wherein, when light emitted from the light source passes through the light guide plate, a first light shape diagram is obtained by performing measurement on the first surface, a second light shape diagram is obtained by performing measurement on the second surface, the first light shape diagram has a first center brightness, the second light shape diagram has a second center brightness, and the first center brightness is greater than the second center brightness.

Other novel features of the disclosure will become more apparent from the following detailed description when taken in conjunction with the accompanying drawings.

DETAILED DESCRIPTION OF EMBODIMENT

Figure 1:
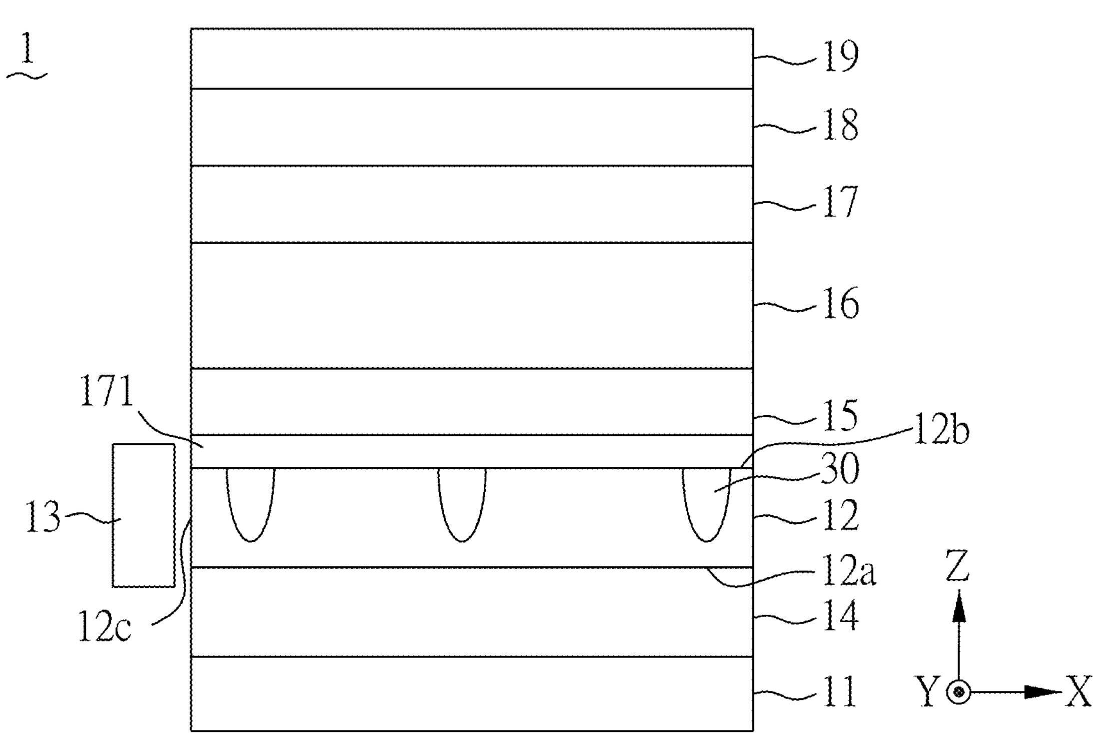
FIG. 1 is a structural diagram of an electronic device according to an embodiment of the present disclosure.

The following disclosure provides many different embodiments or examples for implementing different components in the provided display device. Specific examples of each component and its configuration are described below to simplify the embodiments of the present disclosure. Of course, these are just examples, not intended to limit the present disclosure. For example, if the description mentions that a first component is formed on a second component, it may include an embodiment in which the first component and second component are in direct contact, and may also include an embodiment in which an additional component formed between the first component and second component, so that they are not in direct contact. In addition, the embodiments of the present disclosure may repeat component symbols and/or characters in different examples. This repetition is for brevity and clarity and is not intended to represent a relationship between the different embodiments and/or aspects discussed.

The directional terms mentioned herein, such as "up", "down", "front", "rear", "left", "right" etc., only refer to the directions of the drawings. Accordingly, the directional terms are used to illustrate but not to limit the present disclosure.

In some embodiments of the present disclosure, terms such as "connect", "interconnect", etc. about joining and connection, unless otherwise specified, may refer to direct contact between two structures, or may also refer to two structures being not in direct contact, where there are other structures disposed between the two structures. The terms about joining and connection may also include the case where both structures are movable, or both structures are fixed. In addition, the terms "electrically connected" and "coupled" include any direct and indirect electrical connection means.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims. The terms, such as "about", "equal to", "equal" or "same", "substantially", or "substantially", are generally interpreted as within 20% of a given value or range, or as within 10%, 5%, 3%, 2%, 1%, or 0.5% of a given value or range.

Furthermore, any two values or directions used for comparison may have certain errors. If the first value is equal to the second value, it implies that there may be an error of about 10% between the first value and the second value. If the first direction is perpendicular or "approximately" perpendicular to the second direction, the angle between the first direction and the second direction may be between 80 degrees and 100 degrees. If the first direction is parallel or "substantially" parallel to the second direction, the angle between the first direction and the second direction may be between 0 degrees and 10 degrees.

Unless otherwise defined, all terms (including technical and scientific terms) used here have the same meanings as commonly understood by those skilled in the art of the present disclosure. It is understandable that these terms, such as those defined in commonly used dictionaries, should be interpreted as having a meaning consistent with the relevant technology and the background or context of the present disclosure, rather than in an idealized or excessively formal interpretation, unless specifically defined.

Some variations of the embodiments are described below. In the different drawings and described embodiments, similar reference numerals are used to designate similar components. It can be understood that additional operations may be provided before, during and after the method, and some described operations may be replaced or deleted for other embodiments of the method.

It should be understood that, according to the disclosed embodiments, an optical microscope (OM), a scanning electron microscope (SEM), a film thickness profilometer ($\alpha$-step), an ellipsometer thickness gauge, or other suitable means may be used to measure the depth, thickness, width or height of each component, or the spacing or distance between components. According to some embodiments, a scanning electron microscope may be used to obtain a cross-sectional structure image including the components to be measured, and measure the depth, thickness, width or height of each component, or the spacing or distance between components.

In the present disclosure, the electronic device may include a display device, a backlight device, an antenna device, a sensing device or a tiled device, but not limited thereto. The electronic device may be a bendable or flexible electronic device. The display device may be a non-self-luminous display device or a self-luminous display device. The antenna device may be a liquid crystal type antenna device or a non-liquid crystal type antenna device, and the sensing device may be such a sensing device for sensing capacitance, light, thermal energy or ultrasonic waves, but not limited thereto. Electronic components may include passive components and active components, such as capacitors, resistors, inductors, diodes, transistors, etc. The diodes may include light emitting diodes or photodiodes. The light emitting diodes may, for example, include organic light emitting diodes (OLEDs), sub-millimeter light emitting diodes (mini LEDs), micro light emitting diodes (micro LEDs) or quantum dot light emitting diodes (quantum dot LEDs), but not limited thereto. The tiled device may be, for example, a display tiled device or an antenna tiled device, but not limited thereto. It should be noted that the electronic device may be any permutation and combination of the aforementioned, but not limited thereto. In the following, the display device is used as an electronic device or a tiled device to illustrate the content of the present disclosure, but the present disclosure is not limited thereto.

In addition, the shape of the electronic device may be rectangular, circular, polygonal, with curved edges or other suitable shapes. The electronic device may have peripheral systems such as a processing system, a driving system, a control system, a light source system, and a shelf system to support a display device or a tiled device.

It should be noted that the electronic device can be arranged in any combination as mentioned above, but it is not limited thereto. It should be noted that in the following embodiments, without departing from the spirit of the present disclosure, features in several different embodiments may be replaced, reorganized, and mixed to complete other embodiments. As long as the features of the various embodiments do not violate the spirit of the invention or conflict, they can be mixed and matched arbitrarily.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiment of the present disclosure.

FIG. 1 is a schematic diagram of an electronic device 1 according to an embodiment of the present disclosure. The electronic device 1 includes a reflective panel 11, a light guide plate 12 and a light source 13. In a top view direction (Z), the light guide plate 12 is disposed on the reflective panel 11, and the light guide plate 12 has a first surface 12*a*, a second surface 12*b*, and a side surface 12*c* connected between the first surface 12*a* and the second surface 12*b*, wherein the first surface 12 is adjacent to the reflective panel 11. In addition, the light source 13 is disposed adjacent to the side surface 12*c* of the light guide plate 12.

In one embodiment, the electronic device 1 may further include a first adhesive layer 14, a second adhesive layer 15, a touch layer 16, a third adhesive layer 17, a protective substrate 18 and an optical layer 19 (such as anti-glare layer, anti-reflection layer or anti-fouling layer), but it is not limited thereto. In one embodiment, in the top view direction (Z), the first adhesive layer 14 is disposed between the light guide plate 12 and the reflective panel 11. The touch layer 16 may be disposed on the light guide plate 12, and the second adhesive layer 15 is disposed between the light guide plate 12 and the touch layer 16. The protective substrate 18 may be disposed on the touch layer 16, and the third adhesive layer 17 is disposed between the touch layer 16 and the protective substrate 18. The optical layer 19 may be disposed on the protective substrate 18, but it is not limited thereto.

In one embodiment, the aforementioned components may be increased or decreased arbitrarily according to requirements, for example, the electronic device 1 may not have the optical layer 19.

In one embodiment (not shown), the relative positions of the aforementioned components may be adjusted. For example, the positions of the touch layer 16 and the light guide plate 12 may be interchanged; that is, in the top view direction (Z), the touch layer 16 may be disposed on the reflective panel 11, the light guide plate 12 may be disposed on the touch layer 16, the protective substrate 18 may be disposed on the light guide plate 12, and the optical layer 19 may or may not be disposed on the protective substrate 18, but it is not limited thereto.

In one embodiment, the function of the touch layer 16 may be integrated into the protective substrate 18. For example, the protective substrate 18 may have electrode traces for the touch function. In such an aspect, the light guide plate 12 may be disposed on the reflective panel 11, and the protective substrate 18 having the function of the touch layer 16 may be disposed on the light guide plate 12, but is not limited thereto. The optical layer 19 may or may not be disposed on the protective substrate 18.

Next, details of each component will be described.

First, the reflective panel 11 will be described. In one embodiment, the reflective panel 11 may include a cholesteric liquid crystal panel (ChLC panel) or an electrophoretic panel, but may also be other reflective display panels, while it is not limited thereto.

Next, the light guide plate 12 and the light source 13 will be described. Please refer to FIG. 1 and FIG. 2 at the same time, wherein FIG. 2 is a schematic diagram of the light source 13, which shows an aspect of the light source 13 and the light guide plate 12 in the top view direction and, for the convenience of description, FIG. 2 does not show other components in FIG. 1.

Figure 2:
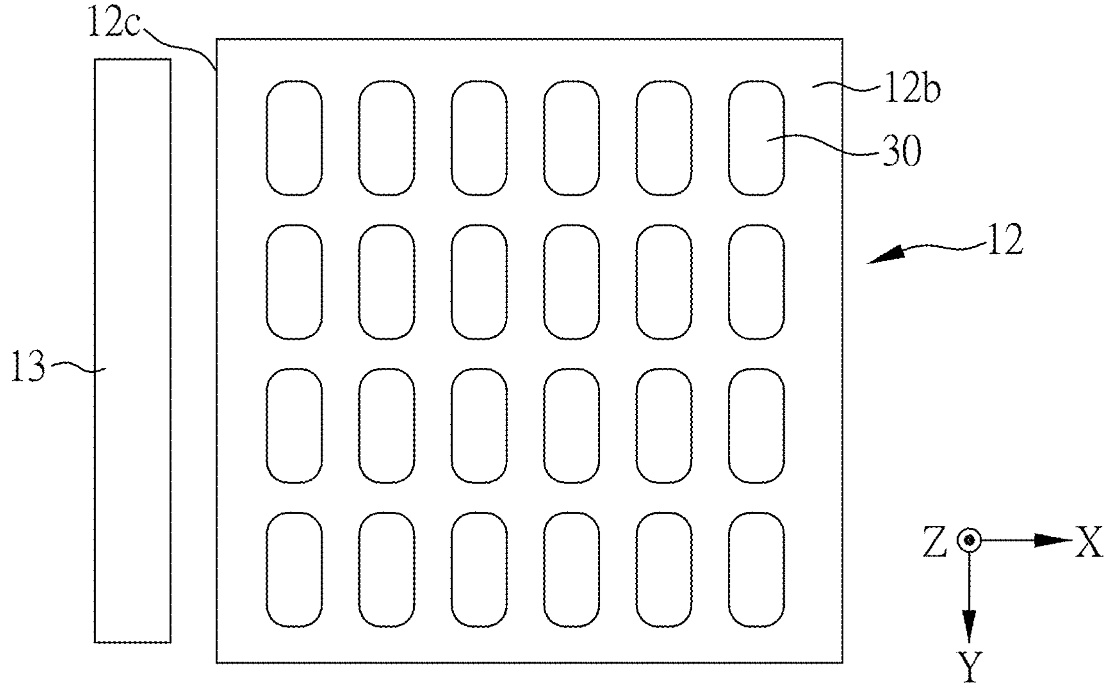
FIG. 2 is a schematic diagram of a light source and a light guide plate according to an embodiment of the present disclosure.

As shown in FIGS. 1 and 2, the light source 13 is adjacent to the side surface 12*c* of the light guide plate 12, and the light emitted from the light source 13 may enter the light guide plate 12 through the side surface 12*c*. In one embodiment, when the light emitted from the light source 13 passes through the light guide plate 12, part of the light may pass through the first surface 12 *a*, and another part of the light may pass through the second surface 12*b*. The light passing through the first surface 12*a* may substantially be directed toward the reflective panel 11, so that the first surface 12*a* may be defined as a “lower light-emitting surface” herein. The light passing through the second surface 12*b* may generally be directed toward the protective substrate 18, so that the second surface 12*b* may be defined as an “upper light-emitting surface” herein. In addition, the light passing through the first surface 12*a* may be used as the light source of the reflective panel 11, while it is not limited thereto. After the light emitted from the light source 13 passes through the light guide plate 12, the first surface 12*a* is measured to obtain a first light shape diagram 21. The first light shape diagram 21 has a first maximum brightness ML1 (shown in FIG. 3). The second surface 12*b* is measured to obtain a second light shape diagram 22, and the second light shape diagram 22 has a second maximum brightness ML2 (shown in FIG. 4), wherein the first maximum brightness ML1 is greater than the second maximum brightness ML2 (that is, ML1>ML2).

In addition, the light guide plate 12 has a plurality of dots 30 on the second surface 12*b*. The dots 30 may affect the brightness distribution of light from the first surface 12*a* or the second surface 12*b*. In one embodiment, the dots 30 may be of any shape or size, but it is not limited thereto. In one embodiment, the dots 30 may be arranged regularly or irregularly, while it is not limited thereto. In one embodiment, the size or shape of each dot 30 may be uniform or non-uniform. In one embodiment, for example, the density of the dots in different areas may be different. For example, the density of the dots in the area adjacent to the light source 13 may be lower than that in the area far away from the light source 13, but it is not limited thereto.

In one embodiment, the material of the first adhesive layer 14, the second adhesive layer 15 or the third adhesive layer 17 may include optical clear adhesive (OCA), liquid optical clear adhesive (LOCA) or other materials with similar functions, while it is not limited thereto. In one embodiment, the first adhesive layer 14, the second adhesive layer 15 or the third adhesive layer 17 may include full-surface adhesive or patterned adhesive (such as frame shaped adhesive or other patterned adhesive). In one embodiment, the adhesive layer adjacent to the dots 30 of the light guide plate 12 may be, for example, patterned adhesive, but it is not limited thereto. In one embodiment, the electronic device 1 may further include a protective layer 171 disposed on the second surface 12*b*, and the protective layer 171 may contact the plurality of dots 30. In one embodiment, the thickness of the first adhesive layer 13, the second adhesive layer 15 or the third adhesive layer 17 in the top view direction (Z) may be 1~10000 μm, while it is not limited thereto.

In one embodiment, the touch layer 16 may include touch glass, touch film or other components with touch function, while it is not limited thereto.

One of the characteristics of the present disclosure is that, when light passes through the first surface 12*a* or the second surface 12*b*, the first surface 12*a* or the second surface 12*b* may have a special brightness distribution of light for reducing the white fog phenomenon so as to improve the frame definition of the electronic device 1. The details will be described below with reference to FIG. 3 and FIG. 4.

Figures 3, 4:
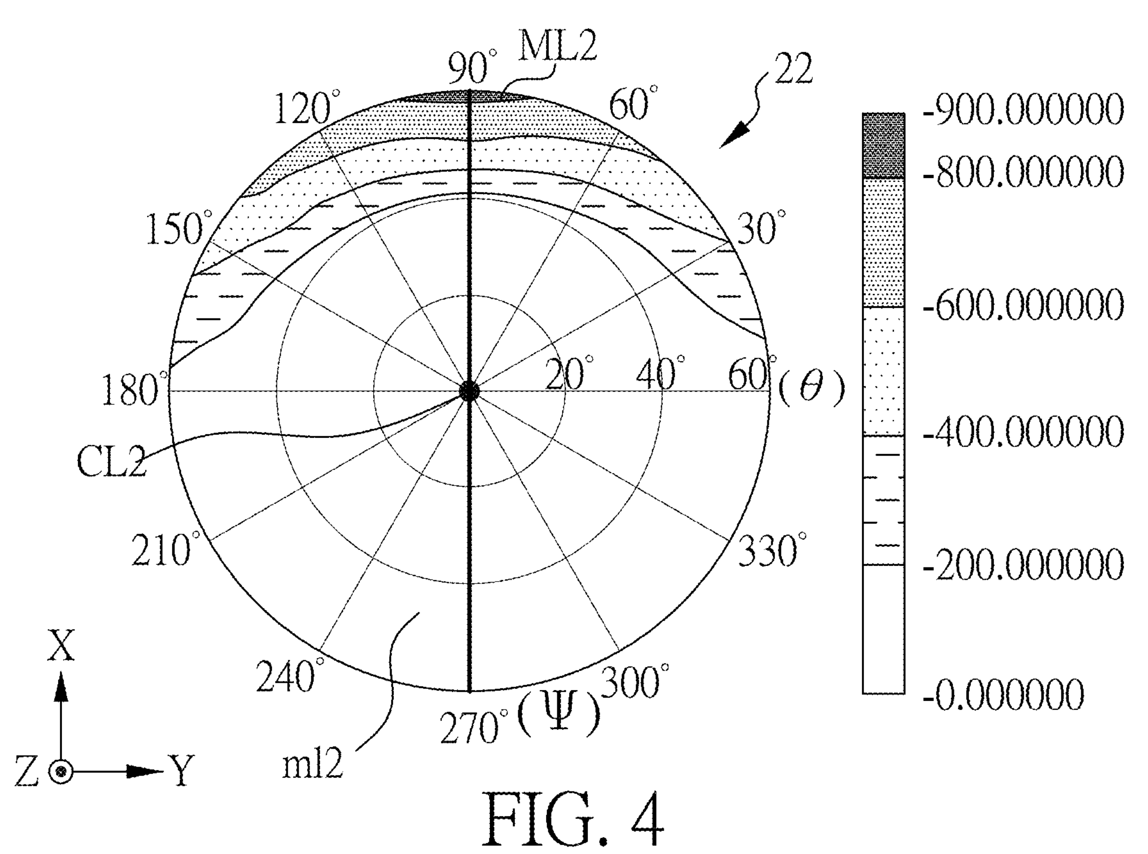
FIG. 3 is a schematic diagram of a first light shape diagram of a light guide plate according to an embodiment of the present disclosure.
FIG. 4 is a schematic diagram of a second light shape diagram of a light guide plate according to an embodiment of the present disclosure.

FIG. 3 is a schematic diagram of the first light shape diagram 21 of the light guide plate 12 according to an embodiment of the present disclosure, FIG. 4 is a schematic diagram of the second light shape diagram 22 of the light guide plate 12 of an embodiment of the present disclosure, and please also refer to FIG. 1 and FIG. 2 at the same time. The first light shape diagram 21 or the second light shape diagram 22 may be obtained by means of an angle analyzer (for example, model DMS-803, but not limited thereto), an image spectrophotometer (for example, conometer) or other machines with similar functions, while it is not limited thereto. In one embodiment, when measuring the first surface 12*a* or the second surface 12*b* of the light guide plate 12, there may be an adhesive layer (such as optical glue) or no adhesive layer on it as the adhesive layer has no significant influence to the light shape diagram.

When the light emitted from the light source 13 passes through the light guide plate 12, the brightness distribution on the first surface 12*a* may be presented in the first light shape diagram 21; that is, the first light shape diagram 21 may present the brightness distribution the lower light-emitting surface of the light guide plate 12. Similarly, when the light emitted from the light source 13 passes through the light guide plate 12, the brightness distribution on the second surface 12*b* may be presented in the second light shape diagram 22; that is, the second light shape diagram 22 may present the brightness distribution the upper light-emitting surface of the light guide plate 12.

The first light shape diagram 21 or the second light shape diagram 22 may be provided with an orientation angle (ψ) and an inclination angle (θ). The orientation angle (ψ) has a magnitude from 0 degrees to 360 degrees, and the orientation angle (ψ) is, for example, an angle corresponding to different directions on the plane of the first surface (12*a*) or the second surface (12*b*) of the light guide plate 12. For example, the position adjacent to the light source 13 may be defined as an orientation angle (ψ) of 270 degrees, and the position far away from the light source 13 may be defined as an orientation angle (w) of 90 degrees. The inclination angle (θ) is defined as the degree of the inclined angle between the first surface (12*a*) or the second surface (12*b*), wherein an inclination angle (0) of 0 degrees represents a direction parallel to the normal of the first surface (12*a*) or the second surface (12*b*), and an inclination angle (θ) of 90 degrees represents a direction parallel to the first surface (12*a*) or the second surface (12*b*), and so on. For other light shape diagrams (as shown in the subsequent FIG. 7 to FIG. 9), the orientation angle (ψ) and the inclination angle (θ) may also be defined in a similar manner. In this embodiment, the inclination angle (θ) is based on the measurement instrument of the light shape diagram, for example, it has a magnitude of 0 degrees to 60 degrees, but it is not limited thereto. If other instruments are used, the inclination angle (θ) may have greater or smaller magnitude. Accordingly, the first light shape diagram 21 may present the brightness distribution of light from the first surface 12*a*, but it is not limited thereto.

As shown in FIG. 3, the first light shape diagram 21 has a first maximum brightness ML1, a first minimum brightness ml1, and a first center brightness CL1, wherein the first maximum brightness ML1 is defined as the maximum brightness of the light being emitted from the first surface 12*a*, the first minimum brightness ml1 is defined as the minimum brightness of the light emitted from the first surface 12*a*, and the first center brightness CL1 is defined as the brightness of the light emitted from the center position of the first surface 12*a* (for example, θ=0°).

In one embodiment, the first maximum brightness ML1 may be between 1200 and 1400 LUX (that is, 1200 LUX≤ML1≤1400 LUX), such as 1220 LUX, but it is not limited thereto. The value of the first maximum brightness ML1 may vary according to the brightness of the light source used for measurement. In one embodiment, the first maximum brightness ML1 may correspond to an inclination angle (θ) of the first light shape diagram 21 of about 30 degrees to 40 degrees (that is, 30°≤θ≤40°) or 32 degrees to 38 degrees (that is, 32°≤θ≤38°), but it is not limited thereto. In one embodiment, the first maximum brightness ML1 may correspond to the orientation angle (ψ) of the first light shape diagram 21 of about 70 degrees to 110 degrees (that is, 70°≤ψ≤110°) or 80 degrees and 100 degrees (that is, 80°≤ψ≤100°), but it is not limited thereto. As a result, when the user faces the reflective panel 11, the light of the first maximum brightness ML1 is reflected by the reflective panel 11 to be located in the user's line of sight, thereby making the display frame of the reflective panel 11 clearer.

In one embodiment, the first minimum brightness ml1 may be between 0 and 400 LUX (that is, 0 LUX≤ml1≤200 LUX), such as 15 LUX, but it is not limited thereto. The value of the first minimum brightness ml1 may vary based on the brightness of the light source used for measurement.

In one embodiment, the first center brightness CL1 is between 0 and 400 LUX (that is, 0 LUX≤CL1≤400 LUX), such as 103 LUX, while it is not limited thereto. The value of the first center brightness CL1 may vary based on the brightness of the light source used for measurement.

In one embodiment, the first center brightness CL1 and the first maximum brightness ML1 satisfy the following relational expression:

$$0<CL1/ML1\leq 0.3,$$

where CL1 is the first center brightness, and ML1 is the first maximum brightness. When the brightness of the light in the center of the first light shape diagram 21 measured on the first surface 12*a* is getting higher, it is highly possible to cause serious white fog phenomenon. Therefore, with the aforementioned relational expression, the brightness of the light at the center of the first light shape diagram 21 may be limited, so as to reduce the white fog phenomenon. The aforementioned numerical range is only an example and, in other embodiments, it may also be 0.05≤CL1/ML1≤0.3, 0<CL1/ML1≤0.25, 0<CL1/ML1≤0.2 or 0<CL1/ML1≤0.1, while it is not limited thereto.

In addition, in one embodiment, the first center brightness CL1 and the first minimum brightness ml1 satisfy the following relational expression:

$$1<CL1/ml1\leq 10,$$

where CL1 is the first center brightness, and ml1 is the first minimum brightness. When the brightness of the light in the center of the first light shape diagram 21 measured on the first surface 12*a* is getting higher, it is highly possible to cause more serious white fog phenomenon. Therefore, with the aforementioned relational expression, the brightness of the light at the center of the first light shape diagram 21 may be limited, so as to reduce the white fog phenomenon. The aforementioned numerical range is only an example and, in other embodiments, it may also be 2≤CL1/ml1≤10, 1<CL1/ml1≤9 or 1CL1/ml1≤8, while it is not limited thereto.

In addition, the first light shape diagram 21 has a first brightness distribution in a first direction (e.g., X direction), wherein the first direction (X) is the direction along which the light guide plate 12 and the light source 13 are arranged. In some embodiments, the first direction (X) may substantially correspond to the normal direction of the side surface 12*c* of the light guide plate 12. The first brightness distribution may be regarded as the brightness distribution of light on the first surface 12*a* from the position with an orientation angle (ψ) of 270 degrees to the position with an orientation angle (ψ) of 90 degrees. In order to further analyze the "first brightness distribution", the brightness of each position on the first surface 12*a* may be normalized. For example, after normalization, taking the maximum brightness in the first brightness distribution as 100%, the brightness percentages of other brightness may be normalized and adjusted according to the ratio relationship with the maximum brightness.

Figure 5:
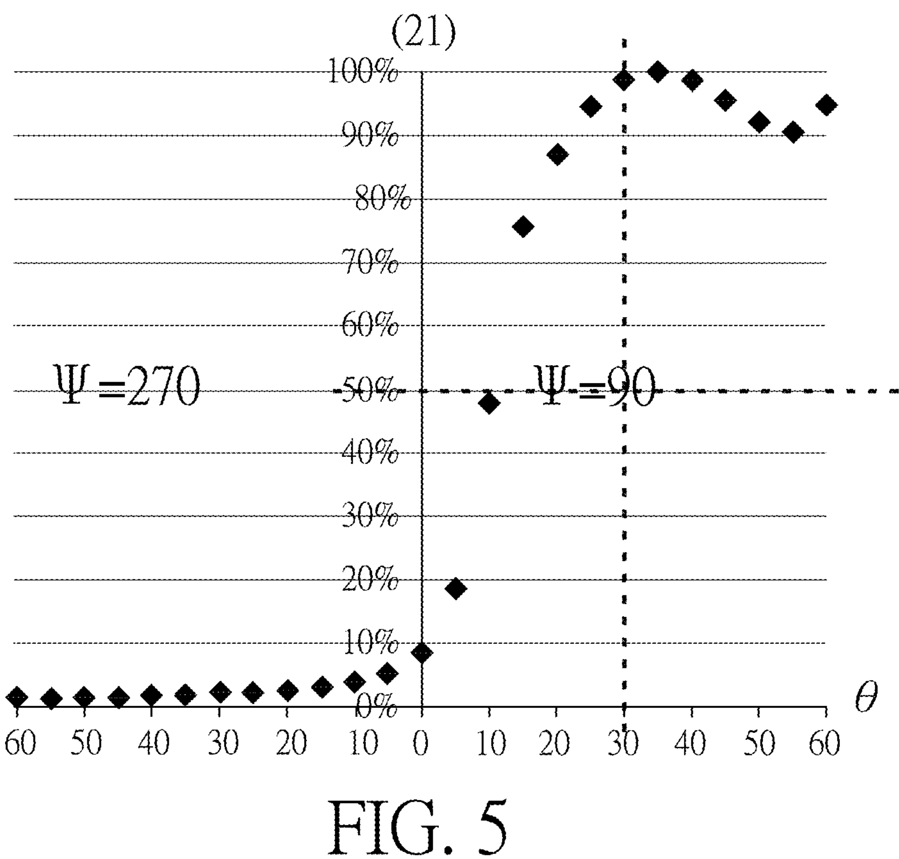
FIG. 5 is a schematic diagram of a first brightness distribution of a light guide plate according to an embodiment of the present disclosure.

Then, please refer to FIG. 3 and FIG. 5 at the same time. FIG. 5 is a schematic diagram of the first brightness distribution of the light guide plate 12 according to an embodiment of the present disclosure, which shows the brightness distribution of light corresponding to different inclination angles (θ) in the first direction (X) of the first surface 12*a*. The left half of FIG. 5 shows the brightness percentage (%) corresponding to the position of each inclination angle (θ) when the orientation angle (ψ) is 270 degrees, and the right half of FIG. 5 shows the brightness percentage (%) corresponding to the position of each inclination angle (θ) when the orientation angle (ψ) is 90 degrees.

As shown in FIG. 5, when the orientation angle (ψ) of the first brightness distribution is 270 degrees, the brightness corresponding to each inclination angle (θ) is smaller than 10% of the maximum brightness and, when the orientation angle (ψ) of the first brightness distribution is 90 degrees, the brightness corresponding to each inclination angle (θ) is greater than 10% of the maximum brightness. In addition, when the orientation angle (ψ) of the first brightness distribution is 90 degrees and the inclination angle (θ) is greater than 30 degrees, the corresponding brightness is greater than 50% of a maximum brightness in the first brightness distribution; that is, the light passing through the first surface 12*a* is mainly concentrated on the position where the orientation angle (ψ) is 90 degrees and the inclination angle (θ) is greater than 30 degrees. With such a design, the frame clarity of the reflective panel 11 may be improved.

In one embodiment, when the inclination angle (θ) of the first brightness distribution is 0 degrees, the corresponding brightness is between 3% and 17% of a maximum brightness in the first brightness distribution (that is, 3%≤brightness≤17%), while it is not limited thereto. When the brightness of the light in the center of the first light shape diagram 21 (for example, the first brightness distribution) is higher, the brightness of the center of the display frame of the reflective panel 11 will be higher, resulting in a more serious white fog phenomenon. Therefore, the brightness when the inclination angle (θ) is 0 degrees is set to be between 3% and 17% of a maximum brightness in the first brightness distribution, so as to reduce the brightness in the center thereby reducing the white fog phenomenon. The aforementioned numerical range of 3% to 17% is only an example and, in other embodiments, it may also be 5%≤brightness≤15%, 6%≤brightness≤14% or 6.5%≤brightness≤13.5%, while it is not limited thereto.

In addition, as can be seen from FIG. 5, in one embodiment, when the orientation angle (ψ) of the first brightness distribution is 90 degrees, the brightness percentage corresponding to the inclination angle (θ) of greater than 0 degrees is greater than the brightness percentage corresponding to the inclination angle (θ) of 0 degrees.

As a result, the first light shape diagram 21 can be understood.

As shown in FIG. 4, the second light shape diagram 22 may have a second maximum brightness ML2, a second minimum brightness ml2 and a second center brightness CL2, wherein the second maximum brightness ML2 is defined as the maximum brightness of the light being emitted from the second surface 12*b*, the second minimum brightness ml2 is defined as the minimum brightness of the light emitted from the second surface 12*b*, and the second center brightness CL2 is defined as the brightness of the light emitted from the center position of the second surface 12*b* (e.g., θ=0°).

In one embodiment, the second maximum brightness ML2 may be between 800 and 900 LUX (that is, 800 LUX≤ML2≤900 LUX), such as 854 LUX, while it is not limited thereto. The value of the second maximum brightness ML2 may vary according to the brightness of the light source used for the measurement. In one embodiment, the inclination angle (θ) corresponding to the second maximum brightness ML2 is about 50 degrees to 60 degrees (that is, 50°≤θ≤60°) or 52 degrees to 58 degrees (that is, the 52°≤θ≤58°), but it is not limited thereto. In one embodiment, the orientation angle (ψ) corresponding to the second maximum brightness ML2 is about 80 degrees to 100 degrees (that is, 80°≤ψ≤100°); that is, the light emitted from the second surface 12*b* is mainly concentrated on the side of the light guide plate 12 far away from the light source 13, but it is not limited thereto.

In one embodiment, the second minimum brightness ml2 is between 0 and 200 LUX (that is, LUX≤ml2≤200 LUX), such as 23 LUX, and the value of the second minimum brightness ml2 may vary based on the brightness of the light source used for measurement, but it is not limited thereto.

In one embodiment, the second center brightness CL2 is between 0 and 200 LUX (that is, 0 LUX≤CL2≤200 LUX), such as 32 LUX, and the value of the second center brightness CL2 may vary based on the brightness of the light source used for measurement, but it is not limited thereto.

Figure 6:
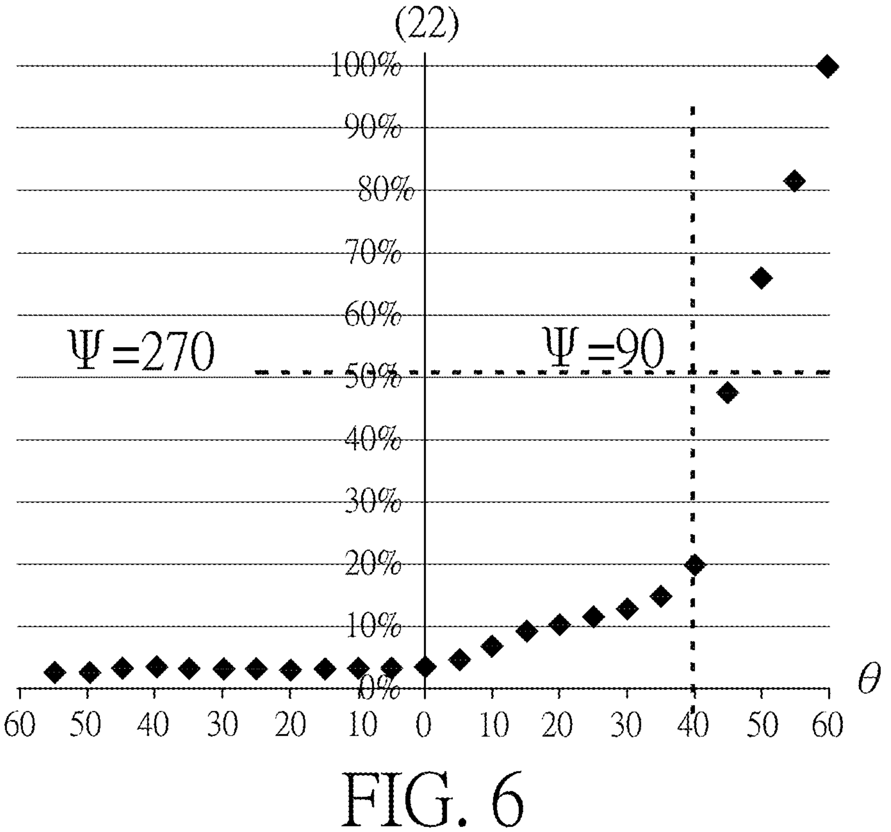
FIG. 6 is a schematic diagram of a second brightness distribution of a light guide plate according to an embodiment of the present disclosure.

In addition, the second light shape diagram 22 has a second brightness distribution in a first direction (for example, X direction), and the first direction (X) is the direction along which the light guide plate 12 and the light source 13 are arranged. FIG. 6 is a schematic diagram of the second brightness distribution of the light guide plate 12 according to an embodiment of the present disclosure, which shows the brightness distribution of light at positions of different inclination angles (θ) when viewing from the position with an orientation angle (ψ) of 270 degrees to the position with an orientation angle (ψ) of 90 degrees, and presents the brightness as a normalized brightness percentage. The left half of FIG. 6 shows the brightness percentage corresponding to the position of each inclination angle (θ) when the orientation angle (ψ) is 270 degrees, and the right half of FIG. 6 shows the brightness percentage corresponding to the position of each inclination angle (θ) when the orientation angle (ψ) is 90 degrees.

As shown in FIG. 6, when the orientation angle (ψ) is 270 degrees, the brightness percentage corresponding to each inclination angle (θ) is smaller than the brightness percentage corresponding to the inclination angles (θ) when the orientation angle (ψ) is 90 degrees. In addition, when the orientation angle (ψ) of the second brightness distribution is 90 degrees and the inclination angle (θ) is smaller than 40 degrees (that is, θ<40°), the corresponding brightness is smaller than 50% of a maximum brightness in the second brightness distribution; that is, less light may pass through the second surface 12*b* at the position where the orientation angle (ψ) is 90 degrees and the inclination angle (θ) is smaller than 40 degrees. With such a design, the light passing through the second surface 12*b* (that is, the light not provided to the reflective panel 11, which may be regarded as noise) is mainly concentrated at the edge of the second surface 12*b*, so as to have insignificant impact on the user's line of sight.

As a result, the second light shape diagram 22 can be understood.

Next, the relative characteristics of the first brightness distribution and the second brightness distribution will be described, and please refer to FIG. 3 to FIG. 6 at the same time. As shown in FIG. 3 to FIG. 6, the first maximum brightness ML1 may be greater than the second maximum brightness ML2 (that is, ML2<ML1). Because the light of the light source of the reflective panel 11 is mainly originated from the light passing through the first surface 12*a* (that is, the lower light-emitting surface), the frame quality of the reflective panel 11 will be affected if the brightness of the light passing through the second surface 12*b* (that is, the upper light-emitting surface) is greater than the light passing through the first surface 12*a* (that is, the lower light-emitting surface), and this problem may be mitigated by the aforementioned design.

In addition, in one embodiment, the first center brightness CL1 and the second center brightness CL2 satisfy the following relational expression:

$$CL1>CL2,$$

where CL2 is the second center brightness. Because the light of the light source of the reflective panel 11 is mainly originated from the light passing through the first surface 12*a*, the frame quality of the reflective panel 11 will be affected if the brightness of the light at the center of the second surface 12*b* is greater than the brightness of the light at the center of the first surface 12*a*, and this problem may be mitigated by the aforementioned design.

With the aforementioned design of the first brightness distribution and/or the second brightness distribution, the white fog phenomenon may be reduced, or the clarity of the display frame may be improved. In addition, various characteristics of the first light shape diagram 21, the second light shape diagram 22, the first brightness distribution and/or the second brightness distribution may be implemented at least by adjusting the density, distribution, size and/or shape of the dots 30 (shown in FIG. 2), while it is not limited thereto.

Next, the light emitting situation when the light guide plate 12 is operated with the reflective panel 11 will be described.

Figures 7, 8:
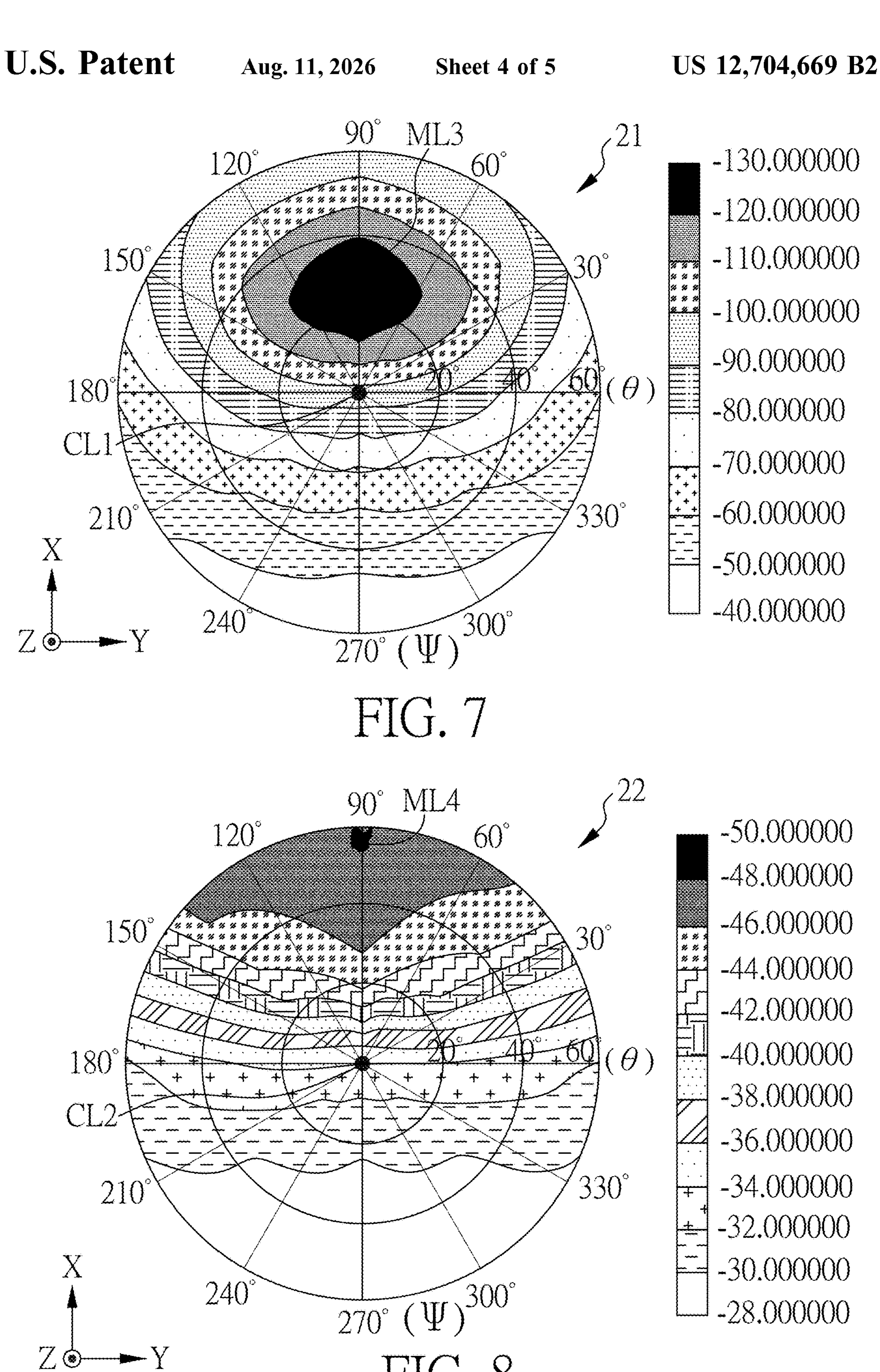
FIG. 7 shows a light shape diagram of a reflective panel and a light guide plate in bright state driving according to an embodiment of the present disclosure.
FIG. 8 shows a light shape diagram of a reflective panel and a light guide plate in dark state driving according to an embodiment of the present disclosure.

FIG. 7 shows a light shape diagram of the reflective panel 11 and the light guide plate 12 in bright state driving according to an embodiment of the present disclosure, which is used to show the brightness distribution on the second surface 12*b* when the reflective panel 11 is driven in the bright state. It is noted that, the measurement result in the embodiment of FIG. 7 is obtained by using a display measurement machine to measure the light guide plate 12 in cooperation with the reflective panel 11 and the light source 13 (for example, the components including the touch layer 16, the protective substrate 18, the optical layer 19, etc. are not included). In addition, there may be or may not be an adhesive layer (such as optical glue) on the first surface 12*a* and the second surface 12*b* of the light guide plate 12. In addition, the light from the second surface 12*b* measured here refers to the light reflected by the reflective panel 11 to pass through the first surface 12*a* and the second surface 12*b* under the influence of the reflective panel 11, while it is not limited thereto.

As shown in FIG. 7, in one embodiment, when the reflective panel 11 is driven in a bright state, the maximum brightness of light measured on the second surface 12*b* (hereinafter referred to as the third maximum brightness ML3) is, for example, between 120 LUX and 130 LUX (that is, 120LUX≤ML3≤130LUX), while it is not limited thereto. The value of the third maximum brightness ML3 may vary according to the brightness of the light source used for measurement. In one embodiment, the third maximum brightness ML3 may correspond to the position with an inclination angle (θ) of about 10 degrees to 40 degrees (that is, 10°≤θ≤40°), and an orientation angle (ψ) of about 40 degrees and 140 degrees (that is, 40°≤ψ≤140°), while it is not limited thereto. In one embodiment, the third maximum brightness ML3 may correspond to the position with an inclination angle (θ) of about 15 degrees to 40 degrees (that is, 15°≤θ≤40°), and an orientation angle (ψ) of about 50 degrees to 130 degrees (that is, 50°≤ψ≤130°), while it is not limited thereto.

FIG. 8 shows a light shape diagram of the reflective panel 11 and the light guide plate 12 in a dark state according to an embodiment of the present disclosure, which is used to show the light-emitting brightness distribution on the second surface 12*b* of the light guide plate 12 when the reflective panel 11 is driven in a dark state. It is noted that, the measurement result in the embodiment of FIG. 8 is obtained by using a display measurement device to measure the light guide plate 12 in cooperation with the reflective panel 11 and the light source 13 (not including components such as the touch layer 16, the protective substrate 18, the optical layer 19, etc.). In addition, there may be or may not be an adhesive layer (such as optical glue) on the first surface 12*a* and the second surface 12*b* of the light guide plate 12. In addition, in the embodiment of FIG. 7 and the embodiment of FIG. 8, the light source 13 provides light with the same brightness.

As shown in FIG. 8, in one embodiment, when the reflective panel 11 is driven in a dark state, the maximum brightness of light measured on the second surface 12*b* (hereinafter referred to as the fourth maximum brightness ML4) is between 48 LUX and 50 LUX (that is, 48 LUX≤ML4≤50 LUX), and the value of the fourth maximum brightness ML4 may vary according to the brightness of the light source used for measurement, while it is not limited thereto. In one embodiment, the fourth maximum brightness ML4 may correspond to the position with an inclination angle (θ) of about 50 degrees to 60 degrees (that is, 50°≤θ≤60°), and an orientation angle (ψ) of about 70 degrees to 100 degrees (that is, 70°≤ψ≤100°), while it is not limited thereto. In one embodiment, the fourth maximum brightness ML4 may correspond to the position with an inclination angle (θ) of about 50 degrees to 60 degrees (that is, 50°≤θ≤60°), and an orientation angle (ψ) of about 80 degrees to 110 degrees (that is, 80°≤ψ≤110°), while it is not limited thereto.

Figure 9:
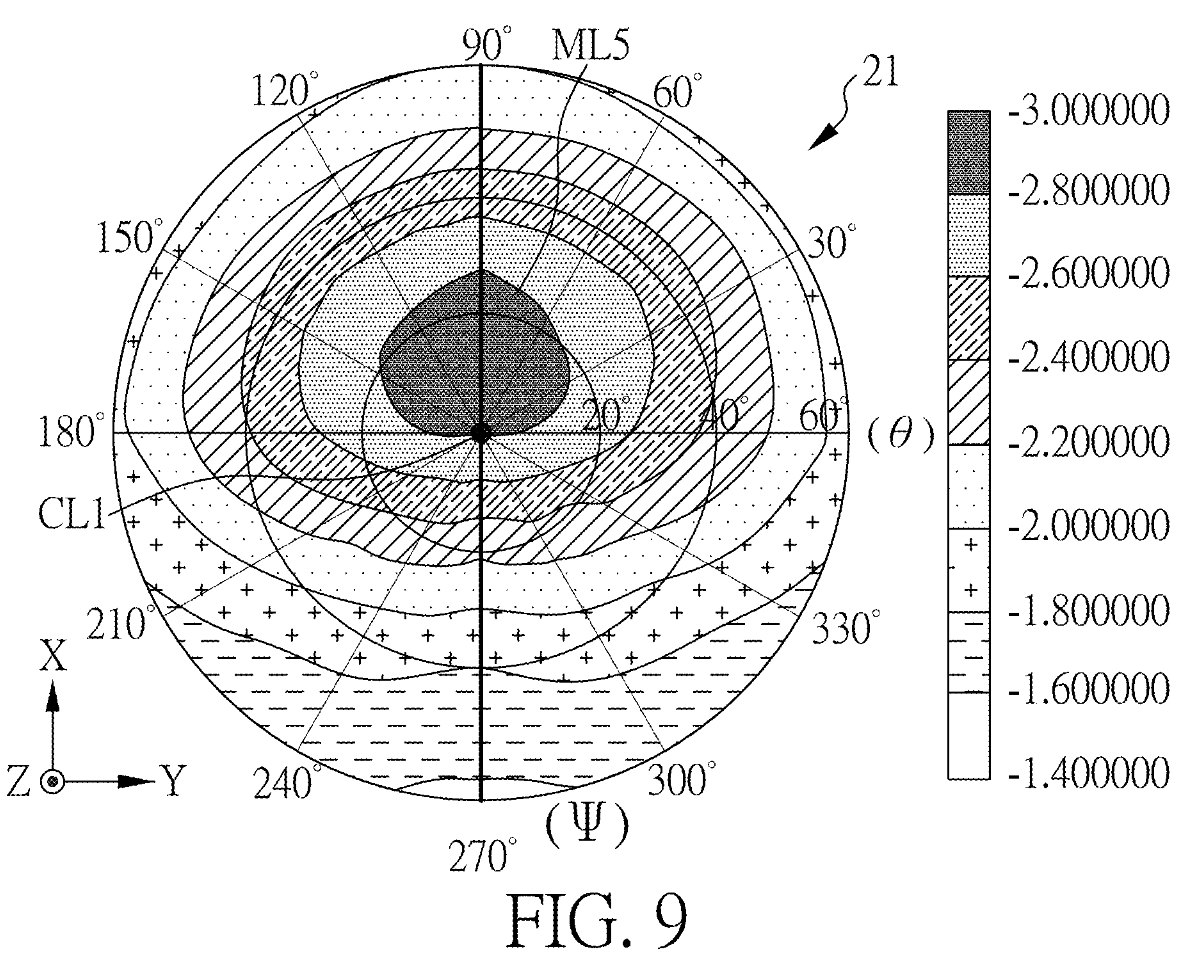
FIG. 9 shows a contrast light shape diagram of a reflective panel and a light guide plate in bright state driving and dark state driving according to an embodiment of the present disclosure.

FIG. 9 shows a contrast light shape diagram of the reflective panel 11 and the light guide plate 12 in bright state driving and dark state driving according to an embodiment of the present disclosure, which is used to show the contrast between the light brightness distribution measured on the second surface 12*b* in bright state driving and the light brightness distribution measured on the second surface 12*b* in dark state driving, and may be regarded as the ratio of the brightness in bright state driving to the brightness in dark state driving that are measured at the same position of the second surface 12*b*.

As shown in FIG. 9, under the contrast of bright state driving and dark state driving, the maximum brightness contrast measured on the second surface 12*b* (hereinafter referred to as the maximum brightness contrast ML5) may be between 2.8 and 3 (2.8≤ML5≤3), while it is not limited thereto. In some embodiments, the maximum brightness contrast ML5 may be between 2.82 and 2.88 (2.82≤ML5≤2.88), while is not limited thereto. In one embodiment, the maximum brightness contrast ML5 may correspond to the inclination angle (θ) of about 0 degrees to 40 degrees (that is, 0°≤θ≤40°). In one embodiment, the maximum brightness contrast ML5 may correspond to an inclination angle (θ) of about 0 degrees to 30 degrees (that is, 0°≤θ≤30°).

With the design of adjusting the dots 30 provided on the light guide plate 12, the brightness distribution of light from the first surface 12*a* and the second surface 12*b* of the light guide plate 12 may have the characteristics of any of the aforementioned embodiments, thereby achieving the effect of reducing the white fog phenomenon.

Figure 10:
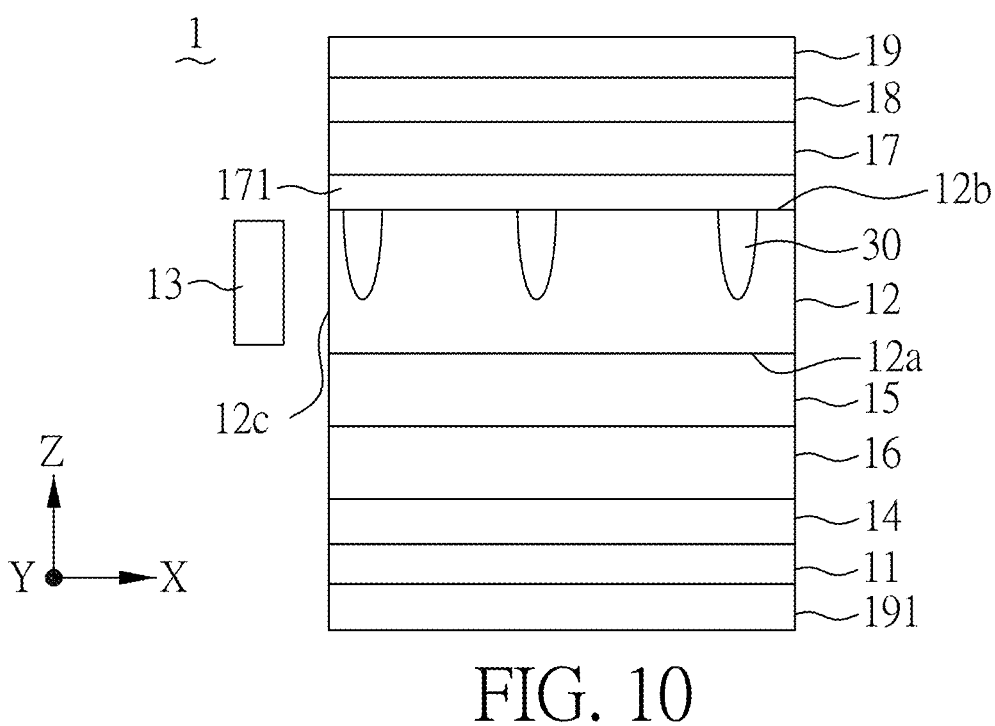
FIG. 10 is a structural diagram of an electronic device according to another embodiment of the present disclosure.

The electronic device 1 of the present disclosure may also have different implementation aspects. FIG. 10 is a structural diagram of an electronic device 1 according to another embodiment of the present disclosure, and please also refer to FIG. 1 to FIG. 9 as reference.

Similar to the embodiment in FIG. 1, the electronic device 1 in FIG. 10 may include a detection component 191, a reflective panel 11, a first adhesive layer 14, a touch layer 16, a second adhesive layer 15, a light guide plate 12, a protective layer (PL) 171, a third adhesive layer 17, a protective substrate 18 and/or an optical layer 19 arranged sequentially, but it is not limited thereto. In some embodiments, the orders of the light guide plate 12 and the touch layer 16 may be selectively interchanged. In some embodiments, the detection component 191 and the reflective panel 11 may be optionally fixed through an adhesive layer. In some embodiments, the touch layer 16 may be disposed on the reflective panel 11, for example. In some embodiments (not shown), the touch layer 16 may be disposed on the protective substrate 18, for example. In some embodiments, any of the aforementioned components or layers may be selectively removed, and other components or layers may be selectively inserted as desired. In some embodiments, there are a plurality of dots 30 on the second surface 12*b* of the light guide plate 12, and the protective layer 171 of the electronic device may be arranged on the second surface 12*b* of the light guide plate 12 and in contact with the plurality of dots for being used to protect the plurality of dots 30, for example, but it is not limited thereto.

As shown in FIG. 10, in the top view direction (Z), the reflective panel 11 may be disposed on the detection component 191. The touch layer 16 may be disposed on the reflective panel 11, and the first adhesive layer 14 may be disposed between the touch layer 16 and the reflective panel 11. The light guide plate 12 may be disposed on the touch layer 16, and the second adhesive layer 15 may be disposed between the light guide plate 12 and the touch layer 16. The protective substrate 18 may be disposed on the light guide plate 12, and the third adhesive layer 17 may be disposed between the protective substrate 18 and the light guide plate 12. The optical layer 19 may be disposed on the protective substrate 18. In one embodiment, the aforementioned adhesive layer (such as the first adhesive layer 14, the second adhesive layer 15 or the third adhesive layer 17) may be a full-surface adhesive layer or a patterned adhesive layer (such as a frame shaped adhesive layer, or adhesive layers with other shapes).

According to other embodiments, the touch layer 16 may include, for example, touch components disposed on the reflective panel 11 (on-cell touch) or touch components disposed in the reflective panel 11 (in-cell touch). According to some embodiments, the touch layer 16 may include touch glass, touch film or other components with touch function, but it is not limited thereto. According to some embodiments, the touch layer 16 may include touch electrodes and wires electrically connected thereto. According to some embodiments, the materials of the touch electrodes and the wires may include metal materials or transparent conductive materials. The transparent conductive material may include, for example, indium tin oxide (ITO), tin oxide (SnO), zinc oxide (ZnO), indium zinc oxide (IZO), indium gallium zinc oxide (IGZO), indium tin zinc oxide (ITZO), antimony tin oxide (ATO), antimony zinc oxide (AZO), other suitable transparent conductive materials or a combination of the foregoing, but it is not limited thereto. According to some embodiments, the touch layer 16 may include capacitive or resistive touch components.

In some embodiments, the detection component 191 may include a resistive detection component, an electromagnetic detection component, a capacitive detection component or other suitable detection components, but it is not limited thereto. In some embodiments, the detection component 191 may be used to detect the position of an input component, for example, the contact position or input signal position of an input component such as an electromagnetic pen, a stylus pen or a laser pen, but it is not limited thereto. According to some embodiments (not shown), the aforementioned touch electrodes and detection component 191 may be integrated together, but the touch electrodes and detection component 191 may be operated separately at different time intervals to reduce signal interference, but it is not limited thereto.

The aforementioned components may be increased or decreased arbitrarily according to requirements, for example, the electronic device 1 may not have the optical layer 19. In addition, the configuration of the aforementioned components may also be adjusted. For example, the positions of the touch layer 16 and the light guide plate 12 may be interchanged; that is, in the top view direction (Z), the light guide plate 12 may be instead arranged on the reflective panel 11, and the touch layer 16 may be disposed on the light guide plate 12, while the protective substrate 18 may be disposed on the touch layer 16. In addition, the optical layer 19 may be or may not be disposed on the protective substrate 18.

In addition, in one embodiment, the touch layer 16 may be disposed on one surface of the protective substrate 18, for example, the protective substrate 18 may have electrode traces with a touch function for being combined with the functions of the original touch layer 16. In this aspect, the light guide plate 12 may be disposed on the reflective panel 11, and the protective substrate 18 may be disposed on the light guide plate 12. In addition, the optical layer 19 may be or may not be disposed on the protective substrate 18.

In some embodiments, the reflective panel 11 may include a plurality of panel units (not shown), and the plurality of panel units (not shown) may include cholesteric liquid crystal layers that reflect light of different colors, such as cholesteric liquid crystal cells that reflect green light, cholesteric liquid crystal cells that reflect blue light and/or cholesteric liquid crystal cells that reflect red light, but it is not limited thereto. According to some embodiments, the number of panel units included in the reflective panel 11 may be adjusted according to requirements. According to some embodiments, the color reflected by the cholesteric liquid crystal cell may be adjusted according to requirements.

As a result, the electronic device 1 of the present disclosure can be understood.

In one embodiment, the present disclosure may at least compare the operation of an object by means of mechanism observation, for example, using the operational relationship between components as evidence of whether the operation of the object falls within the scope of protection of the present disclosure, or may use a display measurement machine to measure the brightness distribution of the light-emitting surface of the object for use as a basis for determination, while it is not limited thereto.

As a result, the present disclosure may provide a clear display frame, so as to solve the problems of the prior art.

The details or features of the various embodiments in the present disclosure may be mixed and matched arbitrarily as long as they do not violate or conflict the spirit of the disclosure.

The aforementioned specific embodiments should be construed as merely illustrative, and not limiting the rest of the present disclosure in any way.

The invention claimed is:

1. An electronic device, comprising:

a reflective element;

a light guide plate disposed on the reflective element, and provided with a first surface, a second surface and a side surface connected between the first surface and the second surface, wherein the first surface is disposed between the reflective element and the second surface; and a light source disposed adjacent to the side surface of the light guide plate, wherein, when light emitted from the light source passes through the light guide plate, a light shape pattern is emitted from the second surface, wherein the light shape pattern has an inclination angle and an orientation angle ranging from 0 to 360 degrees;

wherein in a position far away from the light source is defined as the orientation angle of 90 degrees, and a direction parallel to a normal direction of the first surface is defined as the inclination angle of 0 degrees, and wherein, when the orientation angle is 90 degrees and the inclination angle is smaller than 40 degrees, a corresponding brightness is less than 50% of a maximum brightness in the light shape pattern.

2. The electronic device as claimed in claim 1, further comprising a protective layer disposed on the second surface, wherein the second surface of the light guide plate has a plurality of dots, and the protective layer contacts the plurality of dots.

3. The electronic device as claimed in claim 1, further comprising a touch layer disposed on the light guide plate.

4. The electronic device as claimed in claim 2, further comprising an optical layer disposed on the protective layer.

5. The electronic device as claimed in claim 1, further comprising a first adhesive layer disposed between the light guide plate and the reflective element.

6. The electronic device as claimed in claim 3, further comprising a second adhesive layer disposed between the light guide plate and the touch layer.

7. The electronic device as claimed in claim 6, further comprising a third adhesive layer disposed between the touch layer and a protective layer.

* * * * *